United States Patent [19]

Young et al.

[11] Patent Number: 5,563,007
[45] Date of Patent: Oct. 8, 1996

[54] METHOD OF ENVELOPING AND ASSEMBLING BATTERY PLATES AND PRODUCT PRODUCED THEREBY

[75] Inventors: James Young, Sunriver; Larry T. Keith, Salem; Daniel E. Weerts, Albany, all of Oreg.

[73] Assignee: Entek Manufacturing Inc., Lebanon, Oreg.

[21] Appl. No.: 371,277

[22] Filed: Jan. 11, 1995

[51] Int. Cl.$^6$ ........................................... H01M 2/18
[52] U.S. Cl. ............................. 429/139; 29/623.2
[58] Field of Search .................... 429/136, 139; 29/623.2

[56] References Cited

U.S. PATENT DOCUMENTS

| | | | |
|---|---|---|---|
| 2,851,509 | 9/1958 | Di Pasquale et al. | 429/136 X |
| 2,858,352 | 10/1958 | Solomon | 429/136 |
| 3,442,717 | 5/1969 | Horn et al. | 429/139 X |
| 4,539,271 | 9/1985 | Crabtree | 429/136 X |

*Primary Examiner*—Stephen Kalafut
*Attorney, Agent, or Firm*—Robert E. Howard

[57] ABSTRACT

A method of enveloping and assembling positive and negative plates into a group suitable for use in an electrochemical cell by forming at least one row of alternating positive and negative plates of a predetermined number with the top edges of said plates in longitudinal alignment, enveloping the plates with a separator material by bringing a continuous sheet of separator material into contact with both planar faces of the plates and sealing the separator material along the side and bottom edges of the plates to thereby form a row of enveloped plates interconnected to each other by the separator material, assembling the interconnected row of enveloped plates into a folded group by folding the row in an accordion-like manner, and compressing the folded group into a cube of predetermined size. The product of this method is a group of plates located in interconnected pockets of separator material that has been folded in an accordion-like manner and compressed into a cube of predetermined size.

6 Claims, 4 Drawing Sheets

Fig. 4
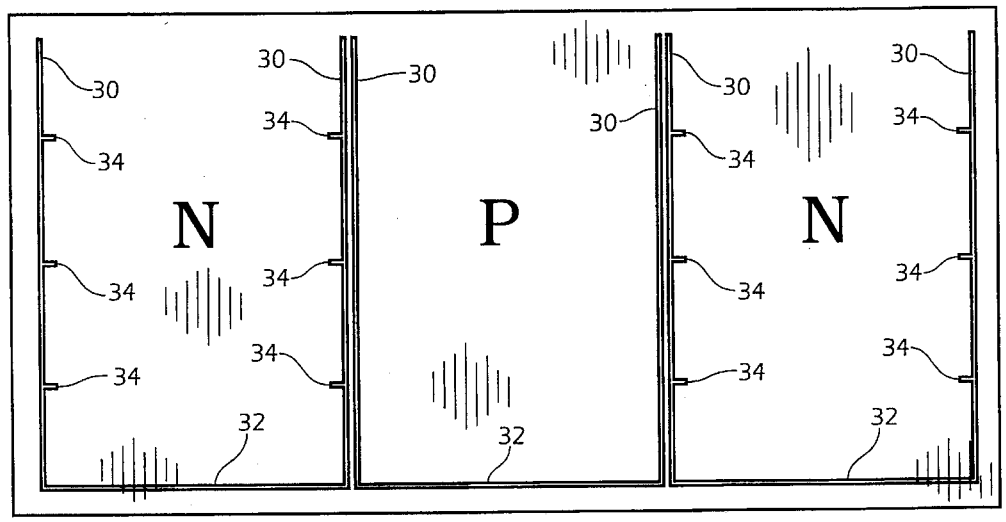
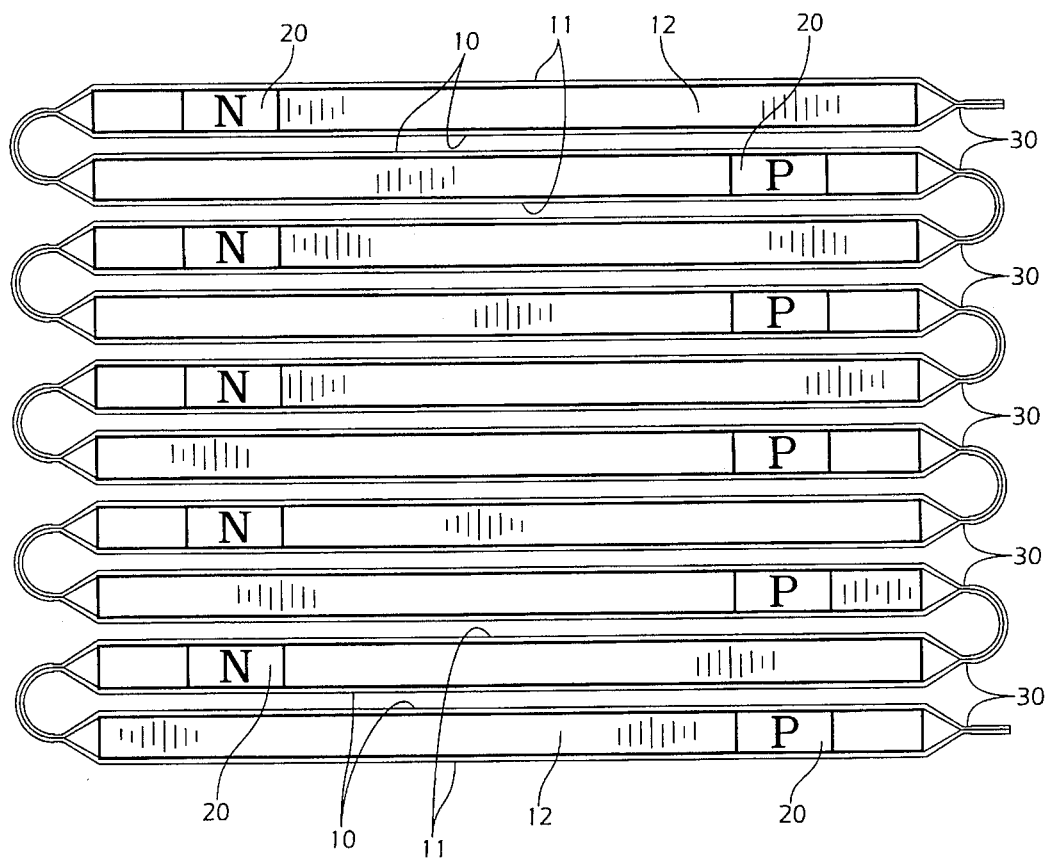
Fig. 6

5,563,007

METHOD OF ENVELOPING AND ASSEMBLING BATTERY PLATES AND PRODUCT PRODUCED THEREBY

BACKGROUND OF THE INVENTION

This invention relates to a method for enveloping and assembling plates into a group for use in an electrochemical cell and the group of enveloped and assembled plates produced thereby.

A number of different types of secondary batteries are constructed of adjacent positive and negative plates separated by a suitable porous separator material. Illustrative of such secondary batteries are lead acid batteries (including both flooded cell and recombinant types of lead acid batteries), metal hydride batteries, reusable alkaline batteries, etc.

Enveloping the separator material around either the positive or negative, or both, has become the preferred method of separation. Enveloping typically involves wrapping the separator around the plate and sealing the separator along both sides. Sealing methods employed include ultrasonic welding, heat sealing and pressure sealing, the latter being the most widely used for lead acid batteries.

For some applications, particularly with metal hydride cells, it is desirable to envelope both plates with the separator material. In such applications it may be critical that the positive and negative plates do not come into contact prior to enveloping, and that any dust generated during enveloping from plates of one polarity not come into contact with plates of the opposite polarity. This could be accomplished by separately enveloping two types of plates and subsequently assembling the plates into cells. However, this approach would require additional and time consuming handling.

It is an object of this invention to provide a method for enveloping positive and negative plates and assembling the plates into a cell that minimizes the time required for such operations. It is a further object to provide an assembly of enveloped plates having a unique structure.

SUMMARY OF THE INVENTION

This invention relates to a method of enveloping a predetermined number of positive and negative plates of a battery or cell with a separator material and assembling the enveloped plates into a group of predetermined size by forming a row of connected enveloped plates, adjacent plates being alternately positive and negative, and assembling the row of connected enveloped plates into a group by folding the row in an accordion-like manner and compressing the folded group into a cube of predetermined size.

The invention also relates to a battery or cell in which the positive and negative plates are enveloped with a separator material having an accordion-like structure.

BRIEF DESCRIPTION OF THE DRAWINGS

FIG. 4 is a front view of three adjacent envelopes showing the presence of temporary centering seals to accommodate negative plate expansion.

FIG. 6 is a top view of a group of enveloped plates folded and compressed into a cube of predetermined size.

DESCRIPTION OF THE PREFERRED EMBODIMENTS

Figure 1:
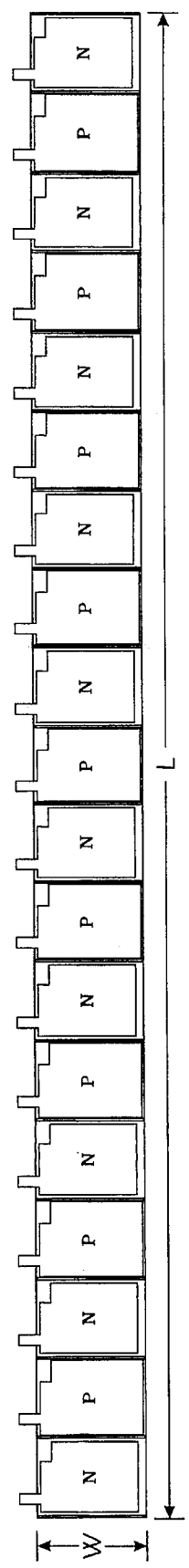
FIG. 1 is a top view of a row of positive and negative plates placed upon a first sheet of separator material.
Figure 2:
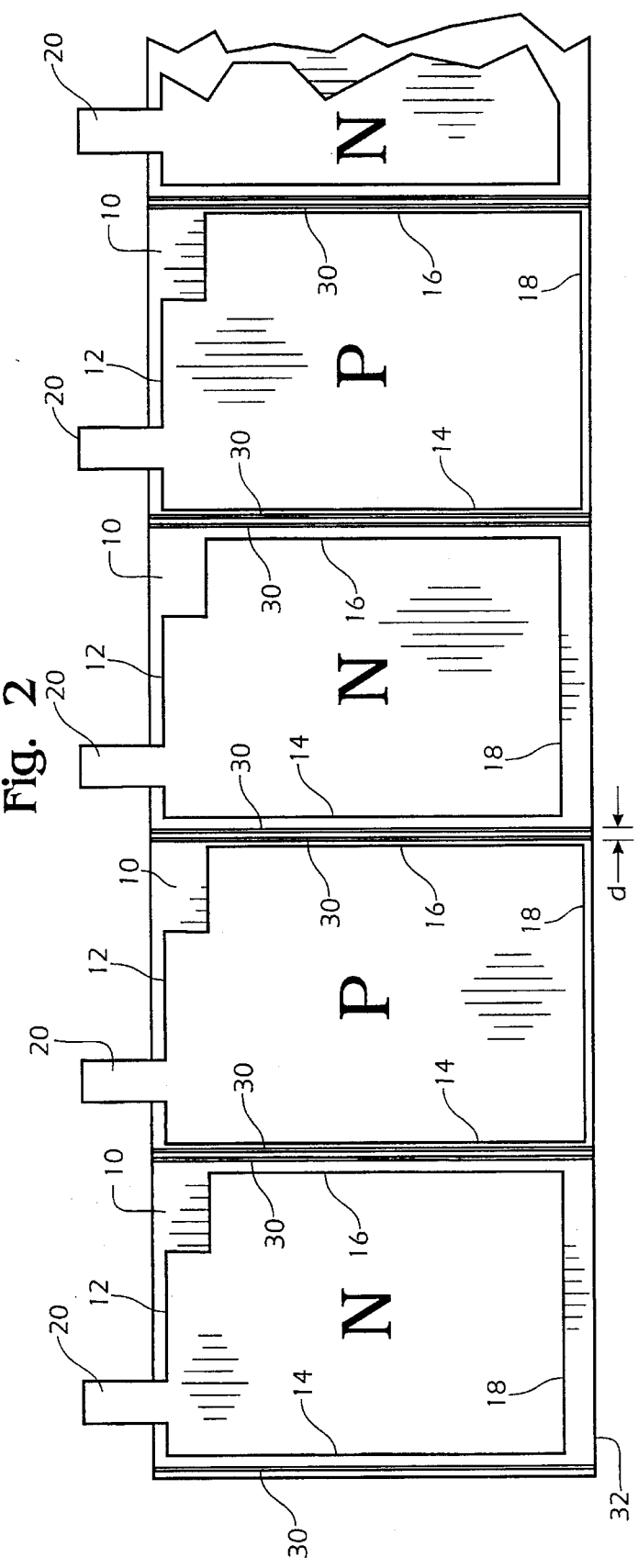
FIG. 2 is an enlarged top view of the left four plates of FIG. 1.

FIGS. 1 and 2 illustrate a plurality of positive and negative plates designated "P" and "N", respectively, placed on top of a horizontally disposed first sheet of separator material 10 having a width "W" and a length "L". As can be seen, the positive and negative plates P and N are alternately disposed.

Each plate has a top edge 12, two side edges 14 and 16 and a bottom edge 18. A single lug 20 extends from the top edge 12 of each plate.

The plates are placed on first separator sheet 10 from a staging area (not shown) in a gentle manner so as not to generate dust. One satisfactory method is by use of a plurality of suction lifters.

The first separator sheet 10 is of such a width, and the plates are positioned on first separator sheet 10 in such a manner, that lugs 20 extend beyond the same edge thereof. The plates are positioned such that lugs 20 are substantially in longitudinal alignment.

Figure 5:
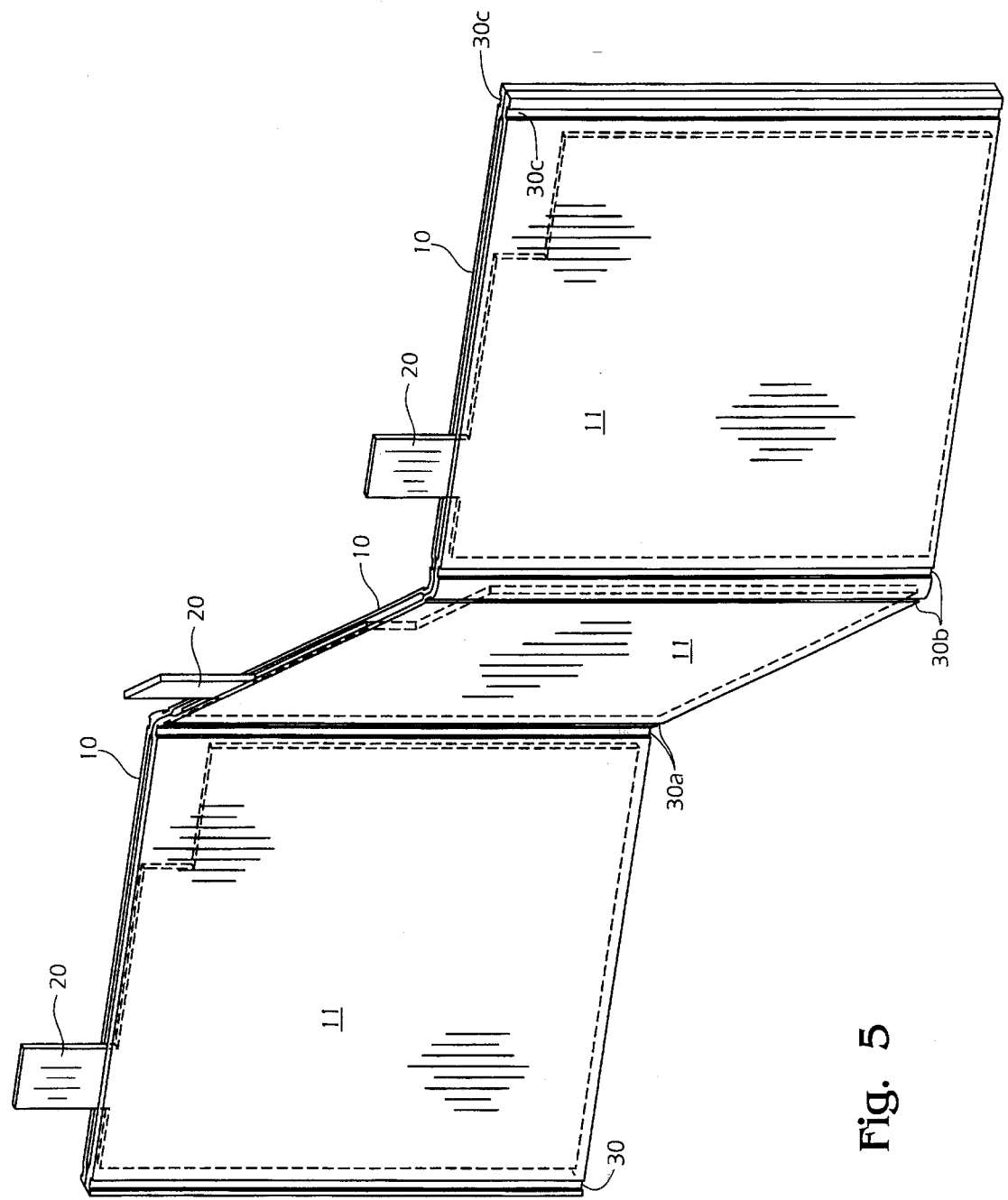
FIG. 5 is a perspective view of three adjacent enveloped plates in the process of being folded accordion-like into a group.

Although not shown in FIGS. 1 and 2 for purposes of clarity, a second separator sheet 11 (as shown in FIG. 5) is positioned on top of the plates positioned on first separator sheet 10. The second separator sheet 11 is substantially the same size as first separator sheet 10 and is placed in alignment therewith.

As best seen in FIG. 2, a plurality of side seals 30 are formed between the first and second separator sheets between the side edges of adjacent plates. It is preferred to form a separate side seal 30 for the side edges of each plate, thereby forming two adjacent and parallel side seals between each adjacent plate. Two such adjacent and parallel side seals 30 are preferred because suitable spacing of such side seals 30 provides a hinge action which takes into account the thickness of the enveloped plates to thereby allow the plates to be folded in an accordion-like manner to be described hereinbelow. A single but wider side seal between adjacent plates could provide a similar hinge action, but it is not as easy and expeditious to effect in practice as the dual side seals between the side edges of adjacent plates.

With certain types of plates, such as the negative plate in a metal hydride cell, the plate expands after the cell is assembled and activated. FIG. 4 illustrates the use of temporary centering seals 34 spaced along and directed inwardly from both side seals 30 of the negative plate envelopes. The temporary centering seals 34 are located so as to hold the negative plates in proper position for subsequent formation of the plates into a group, i.e., so that they are in alignment with the positive plates. The temporary centering seals 34 are of such a number and size that they readily rupture when the negative plate expands, the side seals 30 and bottom seal 32 providing the ultimate containment seals around the negative plate. Spacing such seals approximately every 1.0 to 2.0 inches has been found to be satisfactory for the purpose described.

After enveloping a predetermined number of plates as described above, the enveloped plates are assembled into a group. This is accomplished by alternately raising and lowering the side seals to form an accordion-like configuration, as illustrated with three enveloped plates in FIG. 5. As can be seen by reference to FIG. 5, raising side seal 30a, lowering the next side seal 30b, raising the next side seal 30c, i.e., alternately raising and lowering the side seals seriatim, an accordion-like structure is formed. Although reference has been made to "side seal" 30a, 30b and 30c, it is to be understood that in the preferred embodiment each such "side seal" is comprised of a pair of side seals, as previously described.

The distance "d" between adjacent side seals, or the width of the side seal where a single side seal is used, is such as to permit the accordion-like structure illustrated in FIG. 5 to be formed and, subsequently, compressed into a cube with the planar surfaces of the enveloped positive and negative plates being parallel to each other, as shown in FIG. 6, without the separator material tearing at the fold.

Figure 3:
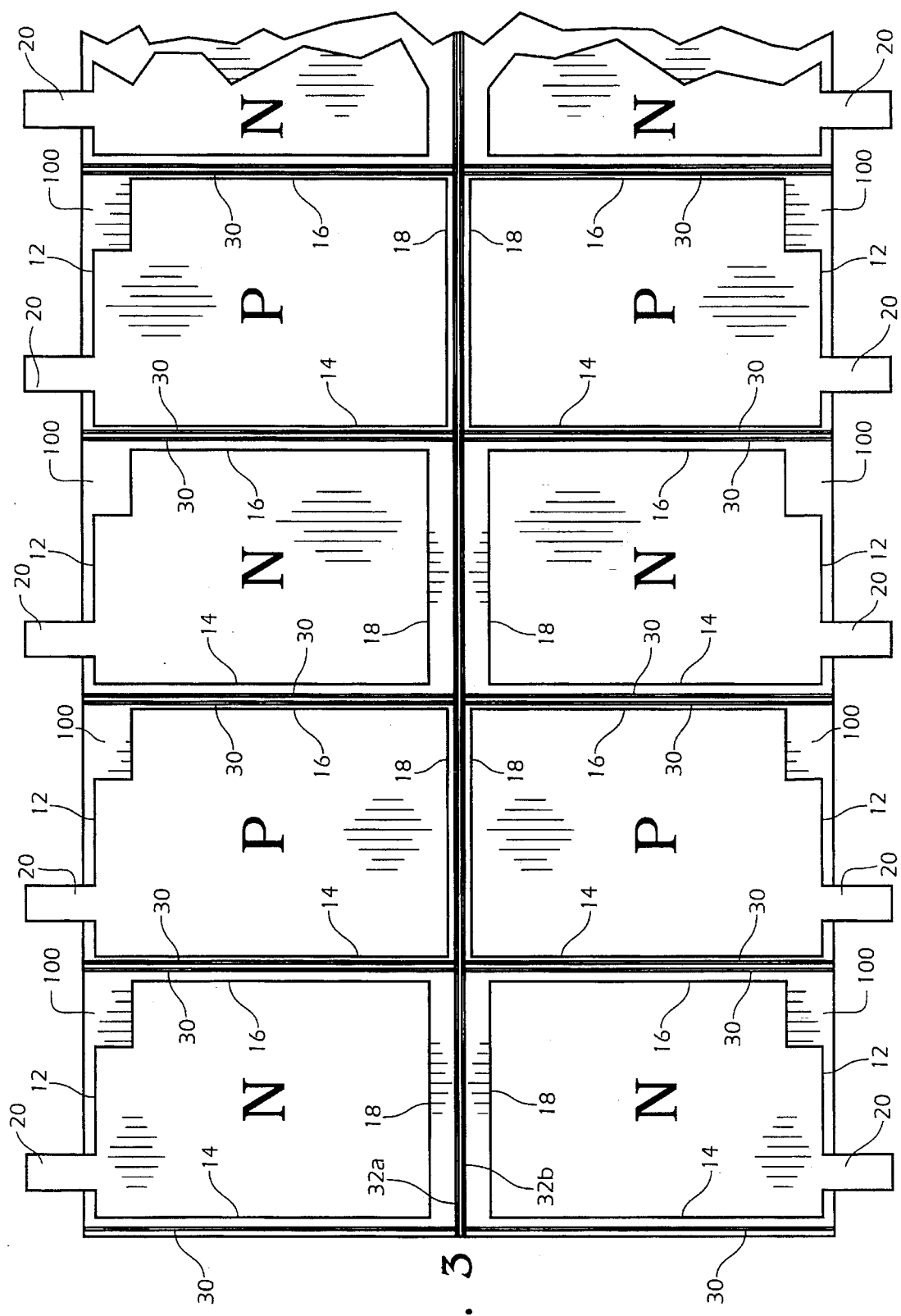
FIG. 3 is an enlarged top view similar to FIG. 2 but showing an alternative embodiment.

FIG. 3 illustrates an alternative embodiment of the invention in which a first separator sheet 100 is approximately twice the size of first separator sheet 10 illustrated in FIG. 2. This permits two rows of positive and negative plates to be laid down on first sheet 100 with their bottom edges 18 facing each other and lugs extending beyond both sides of sheet 100 as shown. A second separator sheet (not shown) substantially the same size as first sheet 100 is then laid down on top of the assembly shown in FIG. 3 and side seals 30 and end seals 32a and 32b formed between the first and second separator sheets in the positions shown in FIG. 5. After sealing, the two rows are slit apart in the area between end seals 32a and 32b by any suitable slitting means. Each row is then treated as described above with regard to the embodiment illustrated in FIGS. 1, 2, 4, 5 and 6.

The preferred method of effecting the seals referred to herein is by heat sealing. Such seals can be effected in a press with a heated die configured to apply heat to the areas to be sealed.

The separator material referred to herein depends upon the type of battery or cell to be constructed and such materials are well known to those skilled in the art. For example, for flooded cell lead acid batteries, microporous polyethylene is typically used. For recombinant lead acid batteries, the separator is typically an absorptive glass mat; such mats can be made heat sealable by incorporation of polymer fibers, or alternative sealing means can be used. For metal hydride cells, the separator material is typically an electrolyte retentive nylon or wettable polypropylene. This invention is very suitable for use in enveloping plates for metal hydride cells where the separator material is wettable polypropylene.

We claim:

1. A method of enveloping and assembling positive and negative plates to form a group to be used in an electrochemical cell comprising forming at least one row of a plurality of alternating positive and negative plates, said plates having their top edges substantially in longitudinal alignment, enveloping said plates with a separator material by bringing a continuous sheet of separator material into contact with both planar faces of said plates and sealing said separator material along the side and bottom edges of said plates to thereby form a row of enveloped plates interconnected to each other by the separator material, there being separate seals along the side edges of each plate to thereby form two adjacent and parallel side seals between adjacent plates, the distance between said adjacent side seals being such as to form hinges that permits easy folding of adjacent plates towards each other along said hinge, assembling the interconnected row of enveloped plates into a folded group by folding the row at said hinges in an accordion-like manner, and compressing the folded group into a cube.

2. The method of claim 1 wherein said plates are for use in a metal hydride cell and the separator material is a wettable polypropylene.

3. A method of enveloping and assembling positive and negative plates to form a group to be used in an electrochemical cell comprising the steps of:
 (a) forming at least one row of interconnected plates by:
  (i) positioning a first sheet of separator material in a substantially horizontal position;
  (ii) providing a plurality of positive and negative plates, each of said plates having a top edge with a lug extending therefrom, a bottom edge and two side edges;
  (iii) placing said plurality of positive and negative plates alternately in at least one row onto the upper surface of said first sheet of separator material, the lugs of said plates being longitudinally aligned and extending beyond the edge of the first sheet of separator material;
  (iv) positioning a second sheet of separator material over said plates, said second sheet of separator material having substantially the same size as said first sheet of separator material and being in substantial alignment therewith;
  (v) forming side seals between said first and second sheets of separator material, said side seals being adjacent and parallel to the side edges of said plates;
  (vi) forming a bottom seal between said first and second sheets of separator material along the bottom edges of said plates, said side seals and said bottom seals being of such a length that they intersect to thereby form a continuous seal around the side edges and bottom edge of each plate;
  (vii) forming at least one temporary centering seal extending between the side seals and the side edges of each negative plate, said temporary centering seals being of such size and number that they hold the negative plates in alignment with the positive plates during assembly into a group but easily rupture upon subsequent expansion of the negative plates;
 (b) assembling said row of interconnected plates into a group by alternately raising and lowering said side seals, seriatim, to form an accordion-like structure, and
 (c) compressing said accordion-like structure into a cube.

4. A group of enveloped plates suitable for use in an electrochemical cell comprising a plurality of positive and negative plates, two sheets of a separator material formed into a row of interconnected pockets, said pockets being formed by a bottom seal and vertical side seals between said sheets of separator material, the number of said pockets being equal to said plurality of plates, individual positive and negative plates being alternately located within adjacent pockets, at least one temporary centering seal extending between the vertical side seals located on each side of each negative plate and the side edges of each said negative plate, said temporary centering seals being of such size and number that they hold the negative plates in alignment with the positive plates but easily rupture upon subsequent expansion of the negative plates, said separator material and plates being folded in an accordion-like manner and compressed into a cube with the plates being substantially in alignment.

5. The group of claim 4 wherein each of said plates has a lug extending from the upper edge thereof, said lugs extending above said pockets with lugs of similar polarity being in substantial alignment.

6. A method of enveloping and assembling positive and negative plates to form a group to be used in an electrochemical cell comprising forming at least one row of a plurality of alternating positive and negative plates, said plates having their top edges substantially in longitudinal alignment, enveloping said plates with a separator material by bringing a sheet of separator material into contact with both planar faces of said plates and sealing said separator material along the side and bottom edges of said plates to thereby form a row of enveloped plates interconnected to each other by the separator material, forming at least one temporary centering seal extending between the side seals and the side edges of each negative plate, said temporary centering seals being of such size and number that they hold the negative plates in alignment with the positive plates during assembly into a compressed group but easily rupture upon subsequent expansion of the negative plates, assembling the interconnected row of enveloped plates into a folded group by folding the row in an accordion-like manner, and compressing the folded group into a cube with the planar faces of the plates being substantially parallel to each other.

* * * * *